(12) United States Patent
Kanevsky et al.

(10) Patent No.: US 6,654,034 B1
(45) Date of Patent: Nov. 25, 2003

(54) INFORMATION PRESENTATION SYSTEM FOR A GRAPHICAL USER INTERFACE

(75) Inventors: Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,618

(22) Filed: May 4, 2000

(51) Int. Cl.$^7$ ................................................ G06F 3/00
(52) U.S. Cl. ........................................ 345/764; 348/585
(58) Field of Search ................................ 345/751, 753, 345/744, 764, 781, 839, 848, 853; 348/586, 584, 587

(56) References Cited

U.S. PATENT DOCUMENTS

| | | | |
|---|---|---|---|
| 5,689,669 A | * 11/1997 | Lynch et al. | 345/848 |
| 5,943,050 A | * 8/1999 | Bullock et al. | 345/115 |
| 6,239,836 B1 | * 5/2001 | Suzuki et al. | 348/211 |
| 6,288,753 B1 | * 9/2001 | DeNicola et al. | 348/586 |
| 6,405,224 B1 | * 6/2002 | Van Der Meer | 707/315 |

* cited by examiner

*Primary Examiner*—Cao (Kevin) Nguyen
(74) *Attorney, Agent, or Firm*—Scully, Scott, Murphy & Presser; Daniel P. Morris, Esq.

(57) ABSTRACT

A system and method for GUI on multiple monitors that are located in the same user work space. This invention involves a computer using an external source that is able to keep track of what applications the user has outside of his/her computer. The computer still has all of these applications within it, but when they are not needed they are taken off the screen. Two methods are disclosed to track these functions of the applications. The first method involves using a connection with the Internet with all the users devices. The second method involves using a video camera to conduct a visual search for certain devices that are on the user's desk. Certain of the items on a user's desk such as an Internet picture frame, a television, a telephone, a calculator, etc. are connected to the Internet. Whether or not the item on the user's desk is being used is determined by the Internet connection. Other items such as a clock, radio, etc. could have a separate source to identify the device. This separate source involves using one or more video cameras to detect if a certain device is located on a users desk. For either method, there can be an option for a menu that would contain a list of applications that could be opened manually if needed.

19 Claims, 7 Drawing Sheets

INFORMATION PRESENTATION SYSTEM FOR A GRAPHICAL USER INTERFACE

BACKGROUND OF THE INVENTION

1. Field of the Invention

This invention generally relates to computer graphical user interfaces. More specifically, the present invention relates to methods and systems that allow the use of the Internet to organize desktops by eliminating applications that already exist on a user's desktop.

2. Discussion of the Prior Art

Many problems exist today as a result of having to use a single computer monitor. These problems range from having to deal with a cluttered desktop to disorganized startups.

There are many applications that are located in a user's computer that are also located outside the computer, e.g. a calculator, clocks, and even televisions. For example, there may be a certain application that exists outside the user's computer that could handle word processing. So, this application for word processing does not need to be shown on the computer monitor screen.

The following is an example of how several monitors are used with one application. Multiple monitors make comparing documents and program switching easier than ever. Appian Graphics has advice on multiple monitor hardware and software solutions. When users upgraded to Windows 98 operating system, those users decided to take advantage of that operating system's ability to use multiple monitors. Now, in addition to a single monitor, users have a second monitor. Users use that second monitor to hold an e-mail window or sometimes a chat window or a text editor.

This approach uses one computer system connected to several monitors. The problem, however, is to extend this when there are many computer systems and embedded devices used by the user.

The reliability of using multiple monitors is displayed in many circumstances. Reliability is improved because two monitors offer the added benefit of safety through redundancy. If a user is working on just one oversized monitor and a problem arises with that monitor, the work comes to an abrupt halt. With two monitors, even if one monitor has a problem, the user can continue the work on the other monitor.

The problem that arises out of this reliability is that this method still can not reduce the cluttering of a desktop because if a person has enough applications, the desktop will stay cluttered.

SUMMARY OF THE INVENTION

An object of this invention is to improve methods and systems for tracking applications operating at a workstation.

Another object of the present invention is to automatically prioritize the presentation of windows on a graphical user interface and to prioritize and access information stored in cache.

This invention involves a computer using an external source to keep track of what applications the user has outside of his/her computer. The computer still has all of these applications within the computer, but when those applications are not needed, the applications are taken of the screen. This is especially needed for computers with small screens, e.g. palmtops.

To be able to track these functions of the applications, two methods can be used for this process. The first method involves using a connection with the Internet with all the user's devices. The second method involves using a video camera to conduct a visual search for certain devices that are on the users desk.

Certain of the items on a user's desk such as an Internet picture frame, a television, a telephone, a calculator, etc. are connected to the Internet. Whether the item on the user's desk is being used or not, is determined by the Internet connection, which determines if the item is on or off. For example, if a user has a calculator on his desk, the calculator would have a connection with the Internet. If the user turns off the calculator, the Internet connection would read this information and send a signal to the computer to turn on the calculator application in the computer. For the Internet to be able to identify these application, the applications are connected to a server. This designated server has a virtual monitor. This virtual monitor is connected to all the small monitors that surround a person. Every small monitor, such as laptop, palmtop, clock, devices, etc., is mapped out on the virtual monitor. When the virtual monitor sees that the device is not being used on the computer but on the user's desk, the virtual monitor sends a signal to the computer to remove the application for this device on the display of the monitor.

Other items such as a clock, radio, etc., could have a separate source to be able to identify a device. This separate source involves using one or more video cameras to detect if a certain device is located on a user's desk. For example, if the user has a calculator located on his or her desk, the video camera detects the calculator and then sends a signal to the computer to take the calculator application off the computer. The cameras are connected to a server that identifies certain objects and devices like watches, calculators, etc. The user describes in an assigned profile whether or not the user would like certain items to remain on their computer desktop even if those items are on the user's desk. This virtual monitor can be used by many users. In addition, if for example, a user has a special window for e-mail not located in the computer. As messages are being sent to the external e-mail device, those messages are also stored in the computer.

For either method there is an option for a small menu that contains a list of applications that can be opened manually if needed.

Also, a system and method for automatic ways of prioritizing the presentation of windows on a graphical user interface (GUI) and for prioritizing and accessing information stored in cache that is used by a web browser. Because it is often difficult to find and organize overlapping windows on a cluttered GUI, in this invention, the viewing (tiling) priority of windows, the size of windows, and the position of windows on a GUI are automatically determined from the following criteria: the time the window was first opened, the time the window was last opened, the length of time the window was visible on the screen, the percentage visibility of the window, the amount of scrolling the window has undergone, the content of the window, the time of day, the number of window accesses, and/or some mathematical function of these criteria.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS OF THE INVENTION

Figure 1:
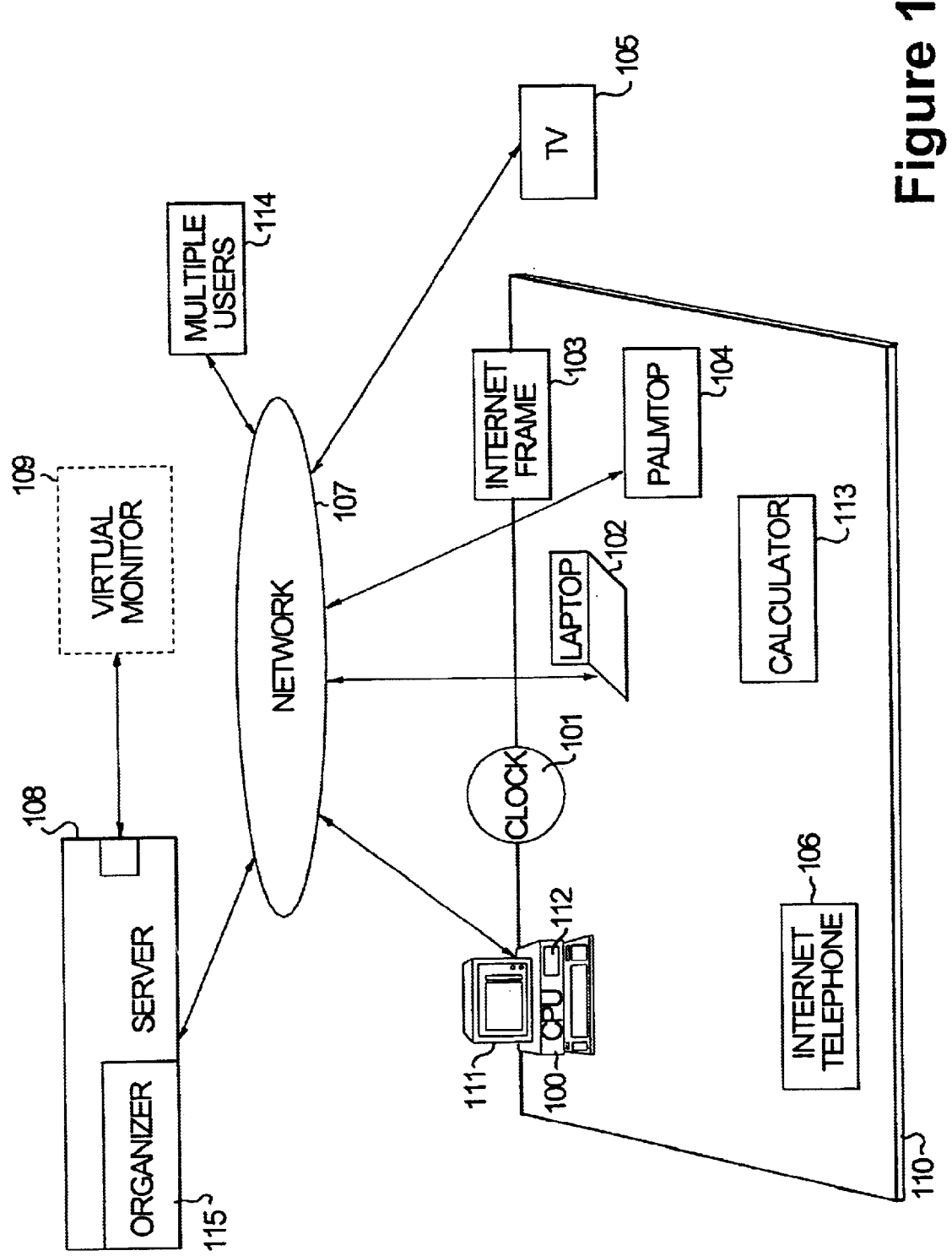
FIG. 1 gives a general description of the many devices and computers that are connected to a network.

FIG. 1 gives a general description of the many devices and computers that are connected to a network. The main computer 100 is on a desk 110 connected to the network 107. There is a laptop 102 that is connected to a network 107. There is also a television set 105, connected to the Internet. There is a palmtop 104 connected to the network, along with a clock 101, Internet telephone 106, Internet frame 103, and a calculator 113. It is important that it be understood that it is not necessary that these items be connected to each other. A server 108, which is connected to the network 107, contains a virtual monitor 109, that maps all devices and computers that are on the desk 110. The organizer 115 in the server 108 organizes icons in a specific way so that if a device is located on the desk 110, that device will not be shown on the computer screen. For example, If a user does not have a device on his/her desk that can be used for e-mail, such a device will be available on the monitor 111.

Also shown in FIG. 1 is a CPU running in a designated area of the computer's memory 112. Therefore all the devices as well as the on-going functions of these devices. What is meant by the on-going functions of the devices is that, if for example an e-mail window device outside of the computer receives an e-mail, this e-mail is also stored inside the computer in the CPU. This is done in case of a disconnection between a device and the Internet, so that, if needed, a user can go into his computer's CPU and extract the information. This method can also be used even if there is no icon inside a computer for a certain device. For example, if a person has a voice message device but does not have a voice message device on his/her computer, the voice message can be saved within the computer. This network can be used by a multiple number of users 114.

Certain of the items on a user's desk such as an Internet picture frame, a television, a telephone, a calculator, etc. are connected to the Internet. Whether the item on the user's desk is being used or not, is determined by the Internet connection, which determines if the item is on or off. For example, if a user has a calculator on his desk, the calculator has a connection with the Internet. If the user turned off the calculator, the Internet connection reads this information and sends a signal to the computer to turn on the calculator application in the computer. For the Internet to be able to identify these applications, the devices are connected to a server. This designated server has a virtual monitor. This virtual monitor is connected to all the small monitors that surround a person. Every small monitor (laptop, palmtop, clock, devices, etc.) is mapped out on the virtual monitor. When the virtual monitor determines that the device is not being used on the computer, but on the user's desk, the virtual monitor sends a signal to the computer to remove the application for this device on the display of the monitor.

Figure 2:
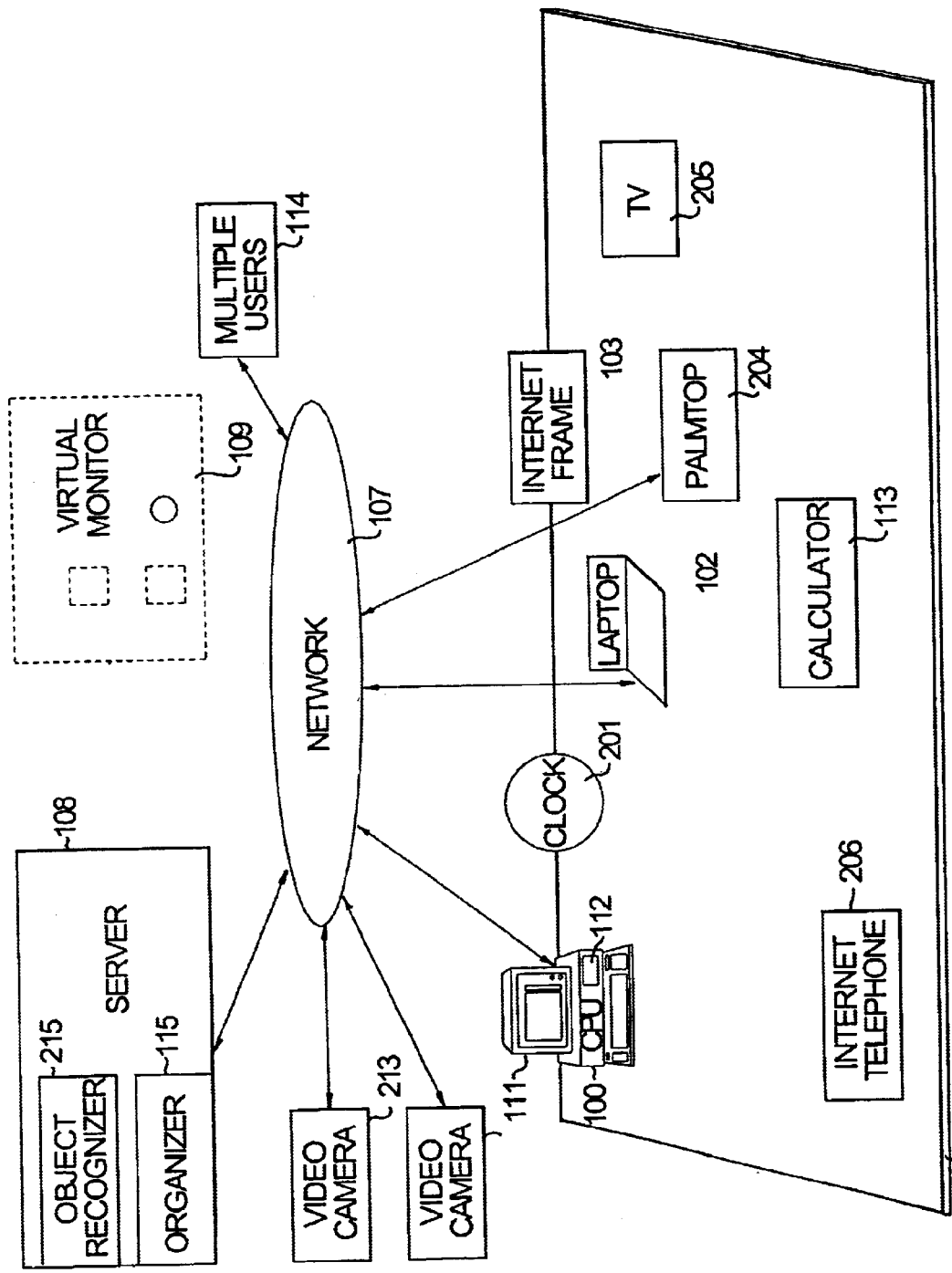
FIG. 2 is similar to FIG. 1 but, instead of using an Internet connection, a video camera is used.

FIG. 2 is similar to FIG. 1, but instead of using an Internet connection, a video camera is used. The main computer 100 is on a desk 110 connected to the network 107. There is a CPU running in a designated area of the computer's memory 112. There is a laptop 102 that is connected to the network 107. There is a palmtop 104 connected to the network. In addition to the items that are connected to the Internet, there are several items being kept track of through video camera 213. These devices are an Internet telephone 206, a clock 201, a palmtop 204, and a television set 205. It is important that it be understood that it is not necessary that these items be connected to each other. A server 108 is connected to the network 107, and this server contains a virtual monitor 109 and maps all devices and computers that are on the desk 110.

The organizer in the server 108 organizes icons in a specific way so that if a device is located on the desk 110, that device will not be shown on the computer screen. The video camera 213 has a connection with the network 107, which has a connection with a server 108, which contains an organizer 115 and an object recognizer 215. Organizer 115 organizes icons in a specific way so that if a device is located on the desk 110, the device will not be shown on the computer screen. The object recognizer 215 has images which the camera has taken of the user's desk. This object recognizer receives the images via network 107, and the recognizer identifies the objects and then sends it through the server to the organizer 115, which sorts the devices and sends it to the virtual monitor. The rest of the devices function exactly as they would in FIG. 1 (through the network).

Items such as a clock, radio, etc. could have a separate source to be able to identify a device using a separate source involving one or more video cameras to detect if a certain device is located on a user's desk. For example, if the user has a calculator located on his or her desk, the video camera would detect the calculator and then send a signal to the computer to take the calculator application off the computer. The cameras are connected to a server that identifies certain objects and devices like watches, calculators, etc. The user describes in a assigned profile whether or not the user would like certain items to remain on their computer desktop even if those items are not on their desks. This virtual monitor can be used by many users. In addition, if for example, a user had a special window for e-mail not located in the computer. As messages are sent to the external e-mail device, those messages are also be stored in the computer.

Figure 3:
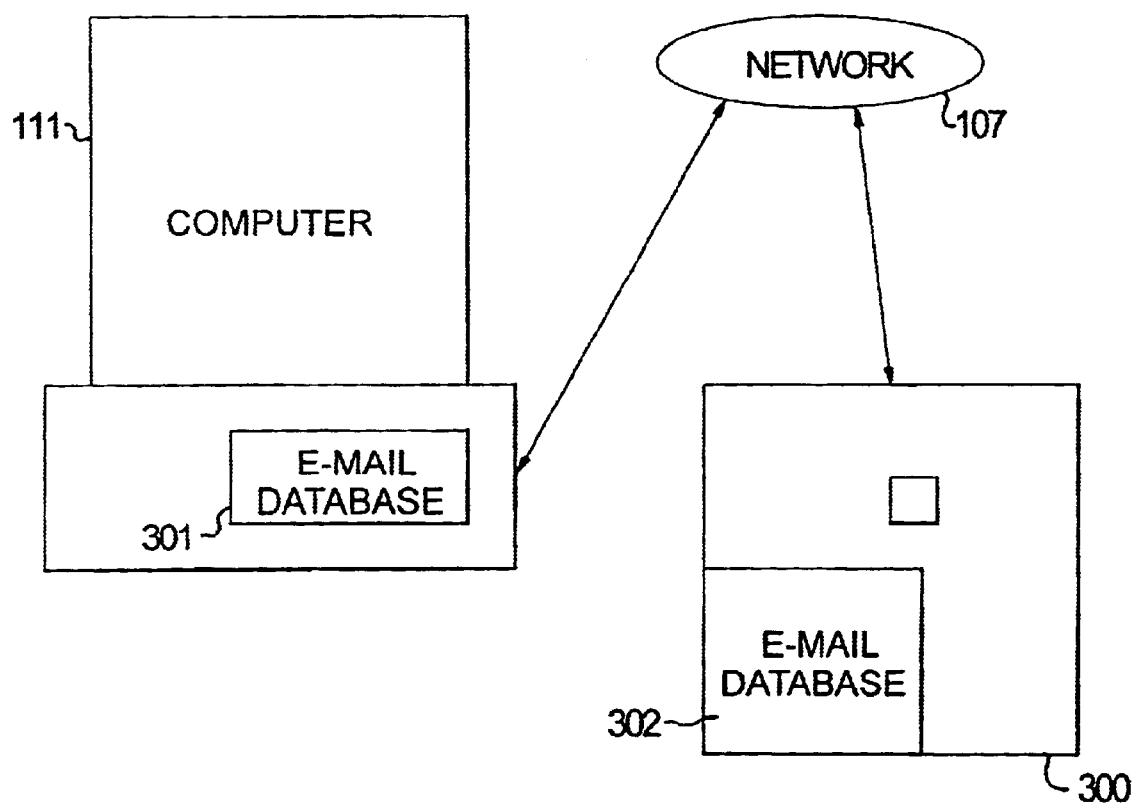
FIG. 3 shows an example of how applications present functions are stored in the computer.

FIG. 3 shows an example of how applications present functions are stored in the computer. The reference number 111 represents a computer that is connected to the network 107 and to an e-mail device 300. This e-mail device is capable of handling the same e-mail operations as the computer. There is an e-mail database 302 that is connected to the computer via the network 107. There is also an e-mail database in the computer 301. This data base is constantly storing information sent to the database by the e-mail database 302 in the e-mail device. This helps prevent problems that may arise when a disconnection occurs between the e-mail device and the network, because the information lost would still remain in the computer's e-mail database 301. The computer email database 301 would also continue to receive new messages.

Figure 4:
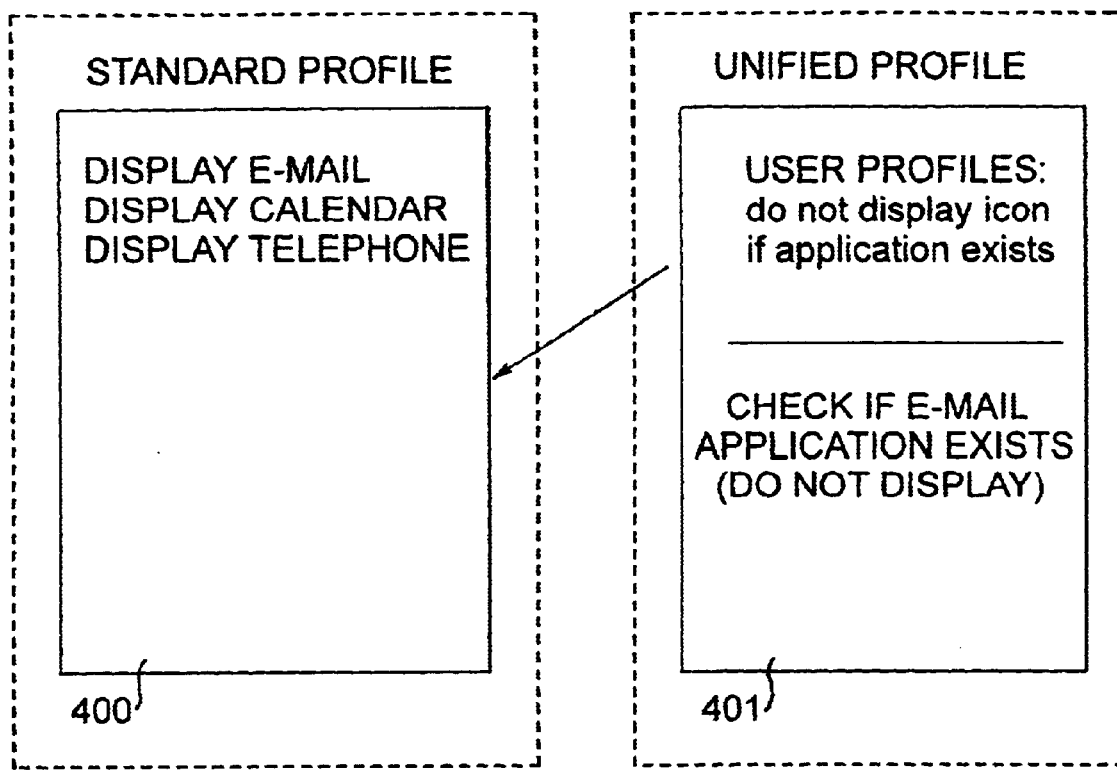
FIG. 4 is an explanation of how a profile works in a computer.

FIG. 4 is an explanation of how a profile works in a computer. The reference number 400 represents the standard profile, and the reference number 401 represents the unified profile. The profile would be the following in a stand alone computer with standard profiles. One person activates their computer. The computer requires the display of an e-mail icon, display of a calendar icon, and a display of a telephone icon. If the computer participates in a unified application framework, then the unified profile is used to dominate the standard profile. The user's profile has user priorities. If the user chooses not to display icons with applications, the profile works the following way. Every item that is required to be displayed on monitor by standard profile is checked. If this application exists in a separate device on some other monitor, it does not display e-mail, it overwrites the standard profile. Unified profile can be located on the Internet and the standard profile can be found on the user's computer.

Figure 5:
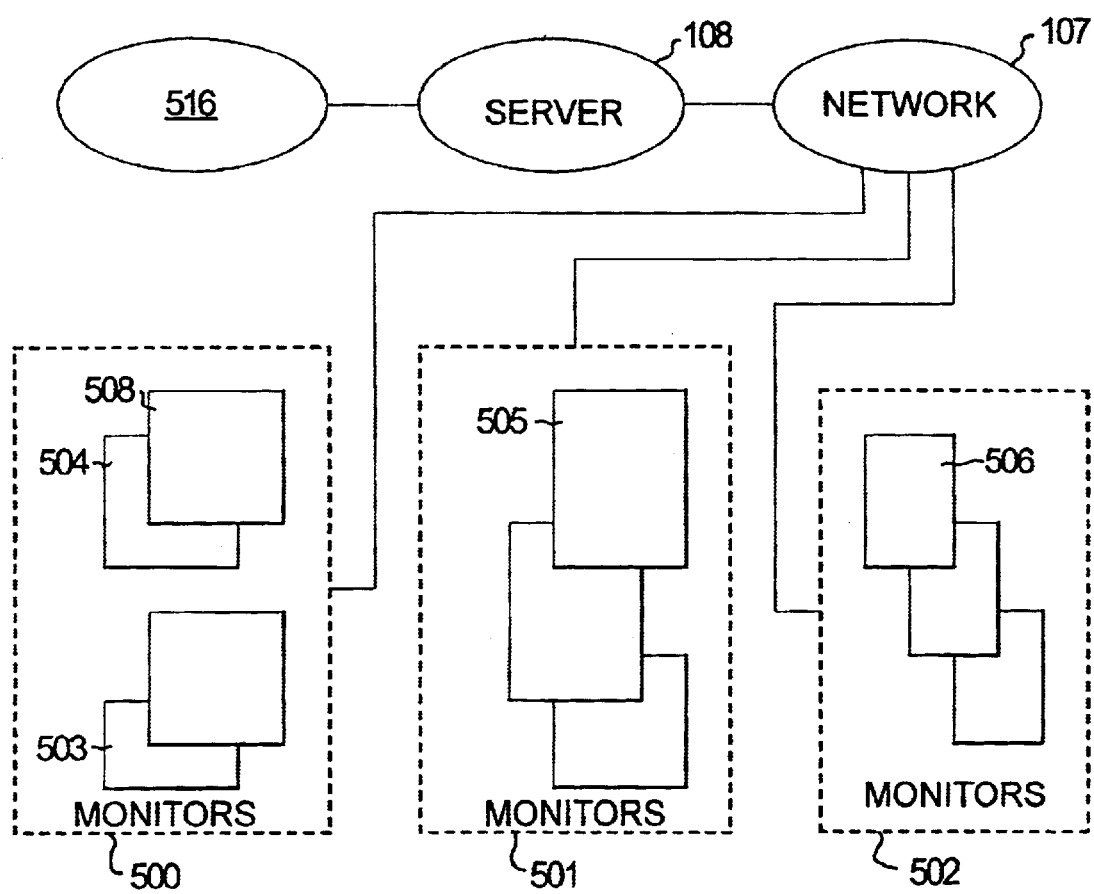
FIG. 5 is an explanation of the case when there are several monitors on one desk.

FIG. 5 is an explanation of the case when there are several monitors on one desk. Each monitor is connected a network 107. The monitors are represented by the numbers 500, 501 and 502. The server 108 was described above in connection with FIG. 1. Application icons are preferably organized on each monitor in such a way that the applications that are used more often are seen in front of all the other applications. In this way, the applications are ordered from most used to least used. The more frequently used icons or applications can be described as the larger icons, and the icons or applications that are used less could be described as the smaller icons. The reference numbers 503, 504 and 505 represent how this process occurs. The reference number 506 is the prioritize. The prioritize keeps track of the priorities for icons on every monitor. Therefore, the prioritize defines which icons have a higher priority by keeping track of each time an icon is used. The prioritize can put several large icons that are used more frequently than others on a separate monitor and the icons used less frequently on a different monitor.

Figure 6:
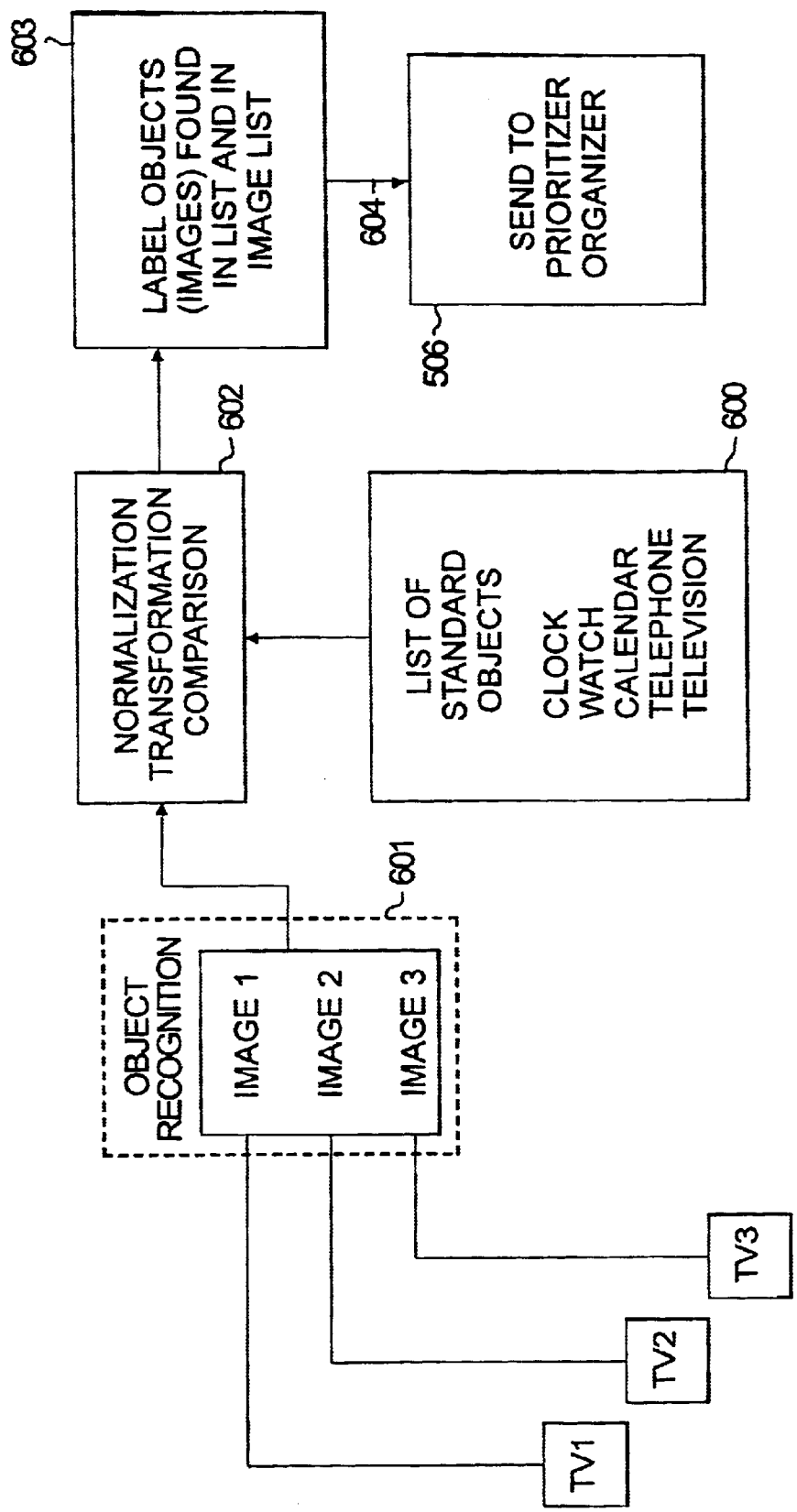
FIG. 6 gives a description of the object recognition module from FIG. 2.

FIG. 6 gives a description of the object recognition module from FIG. 2. A video camera 213 captures an image. These images are sent to a server 215. The server receives the images and sends those images through an object recognizer 601. The image is processed through module 602, which normalizes, transforms and compares the image. The images are compared to a list of standard objects 600. These standard objects contain images of many forms of clocks, watches, calendars, telephones, televisions, etc. that could be located on user's desk. If an object is identified using a list of standard objects, that object is immediately labeled using module 603. Module 603 labels an object, that was found on the list of standard objects 600, to make this device easier to identify. Module 604 prioritizes applications by using a prioritizer 506 or an organizer 115. This prioritizer organizes all the user's applications from the most used applications to the least used applications. The most used applications can be put on a separate monitor and the least used applications can be put on a different monitor.

Figure 7:
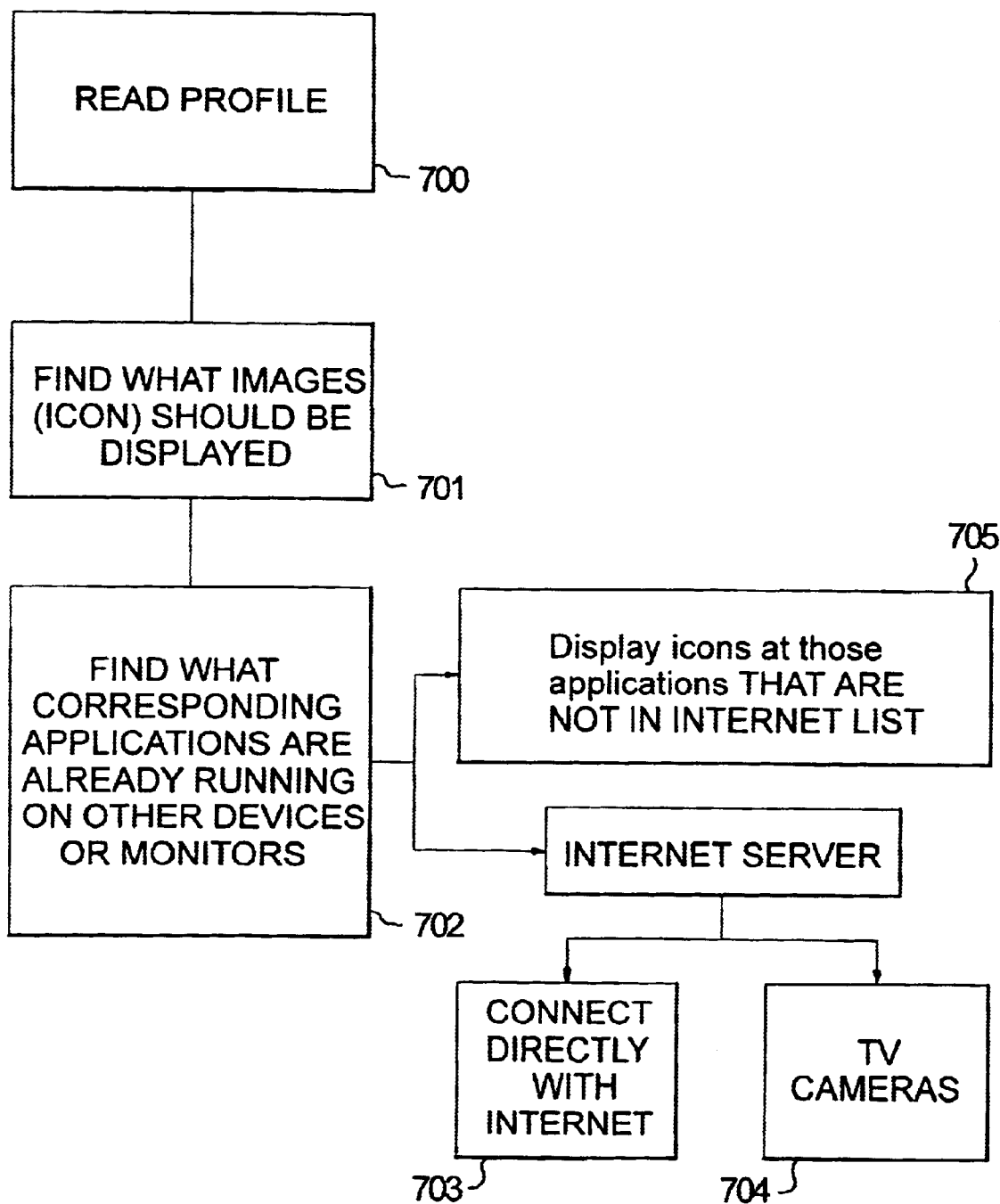
FIG. 7 shows a flow chart of how icons are recognized.

FIG. 7 is a flow chart showing a procedure for recognizing icons. First, at step 700, the profile is read in one or more monitors. This finds what image icons should be displayed on the monitor 701. Then, at step 702, what corresponding applications are already running on other monitors is found. This is found through an Internet server with the devices that are connected directly to the Internet 703, or those that are connected through video camera 704. This can also be found by the display icons of those applications that are not on the Internet list. Then, the icons are organized and prioritized as shown in 706. The icons may be prioritized in accordance to the importance of the item.

While the invention has been particularly shown and described with respect to illustrative and preformed embodiments thereof, it will be understood by those skilled in the art that the foregoing and other changes in form and detail may be made therein without departing from the spirit and scope of the invention which should be limited only by the scope of the appended claims.

Having thus described our invention, what we claim as new, and desire to secure the Letters Patent is:

1. A system comprising:
   a video monitor, a central processing unit and a memory unit located in a user working place, wherein the central processing unit runs a plurality of computer applications, and the central processing unit includes means to display a plurality of icons on the monitor, each of the icons representing one of said applications, and
   a server remote from the user working place and defining a virtual monitor,
   wherein the central processing unit and the server are connected by a network,
   the server including means to control and coordinate the display of the icons and transmits to the central processing unit information to display the icons in a manner determined by the server.

2. The system as in claim 1, where control and coordination of application and GUI means one or mote of the following:
   a) similar applications are represented by only one GUI element on some monitor;
   b) if some of monitor is deactivated, then a GUI element that was run on this monitor is activated on some other monitor;
   c) data associated with application is stored in memories in such a way to enable a GUI element on monitors associated with these memories if some of monitor with these GUI elements are deactivated;
   d) profiles for starting GUI on monitors are coordinated if these profiles activate similar application;
   e) setting priorities for GUI elements and displaying GUI elements in accordance with priorities.

3. The system as in claim 2 where GUI element associated with an application means one or more of the following:
   an icon, window, shell, picture, text, a set of icons, a set of windows, a graph, a fractal icon.

4. The system as in claim 2 where some of embedded devices are associated with single applications.

5. The system as in claim 4, where single applications include one or more of the following:
   clock, calendar, frame, TV, telephone, e-mail, word processing.

6. The system as in claim 2, where similar applications represented by GUI elements on devices that are associated with single applications and on other monitors with multiple GUI elements these GUI elements are deactivated.

7. A system according to claim 6, further comprising:
   an e-mail device for handling e-mail operations and including an e-mail database; and a computer connected to the e-mail device via a network, and including (i) means for handing the e-mail operations, and (ii) an e-mail database for storing information sent to the database by the e-mail database in the e-mail device, to help prevent problems that may arise when a disconnection occurs between the e-mail device and the network, because the information lost remains in the computer's e-mail database, and the computer's e-mail database continues to receive new messages.

8. The system as in claim 1, where some of memories are located in embedded devices such as watches, cameras, palmtops, web phones.

9. A system according to claim 1, for use with a computer having a standard profile and a unified profile, wherein the profile is the following in a stand alone computer with standard profiles: one person activates a computer; the computer requires the display of an e-mail icon, display of a calendar icon, and a display of a telephoneicon; if the computer participates in a unified application framework, then the unified profile is used to dominate the standard profile; the user's profile has user priorities; if the user chooses to not display icons with applications, it works the following way: for every item that is required to be displayed on monitor by standard profile is checked; if this application exists in a separate device on some other monitor, it does not display e-mail, it overwrites the standard profile; unified profile can be located on the Internet and the standard profile can be found on the user's computer.

10. A system according to claim 9, wherein the unified profile can be located on the Internet, and the standard profile can be found on the user's computer.

11. A system according to claim 10, wherein there are several monitors on one desk; each monitor is connected application icons are organized on each monitor in such a way that the applications that are used more often are seen in front of all the other applications, so in this way, the applications are ordered from most used to least used; the more frequently used icons or applications are described as the larger icons and the icons or applications that are used less are described as the smaller icons; a prioritizer keeps track of the priorities for icons on very monitor; the prioritizer defines which icons have a higher priority by keeping track of each time an icon is used; the prioritizer can put several large icons that are used more frequently than others on a separate monitor and the ones used less frequently on a different monitor.

12. A system comprising:
   a video monitor, a central processing unit, a memory unit, and a television camera located in a user working place, wherein the central processing unit runs a plurality of computer applications, and the central processing unit includes means to display a plurality of graphical user interface icons on the monitor, each of the icons representing one of said applications, and
   a server remote from the user working place and defining a virtual monitor,
   wherein the central processing unit and the server are connected by a network,
   the server including
      i) means to control and coordinate the display of the icons and transmits to the central processing unit information to display the icons in a manner determined by the server, and
      ii) an object recognition module to identify objects in the user working place.

13. The system as in claim 12, where control and coordination of applications and GUI means one or more of the following:
   a) similar applications are represented by only one GUI element on some monitor;
   b) if one of the monitors is deactivated, then a GUI element that was run on this monitor is activated on some other monitor;
   c) a data associated with applications is stored in memories in such a way to enable a GUI element on monitors associated with these memories if one of the monitors with these GUI elements was deactivated;
   d) profiles for starting GUI on monitors are coordinated if these profiles activate similar applications;
   e) setting priorities for GUI elements and displaying GUI elements in accordance with priorities.

14. A system according to claim 12, wherein a video camera captures images; these images are sent to a server; the server receives the images and sends them through an object recognizer; the image is processed through a module, which normalizes, transforms and compares the image; the images are compared to a list of standard objects; these standard objects contain images of many forms of clocks, watches, calendars, telephones, televisions, etc. that could be located on user's desk; if an object is identified using a list of standard objects, the object is immediately labeled using the module; the module labels an object that was found on the list of standard objects to make this device easier to identify; a second module prioritizes applications by using a prioritizer or an organizer; this prioritizer organizes all the user's applications from the most use applications to the least used applications; the most used applications are put on a separate monitor and the least used applications are put on a separated monitor.

15. A method for recognizing icons, comprising the steps;
   first, reading a profile in one or more monitors; to finds what image icons should be displayed on an identified monitor each of the icons representing a computer application;
   then, finding, through an Internet server, applications running on monitors by using one of a group of defined procedures; and
   then, organizing and prioritizing the icons in accordance to the importance of the item applications represented by the icon.

16. A program storage device readable by machine, tangibly embodying a program of instructions executable by the machine to perform method steps for recognizing icons, the method steps comprising:
   reading a profile in one or more monitors to determine what image icons should be displayed on an identified monitor each of the icons representing a computer application;
   finding applications are already running on a set of monitors; and
   organizing and prioritizing the icons in accordance with the important of applications represented by the icons.

17. A program storage device according to claim 16, wherein the finding step includes the step of finding what corresponding applications are already running on other monitors through an Internet server with the devices that are connected directly to the Internet or those that are connected through a video camera.

18. A program storage device according to claim 16, wherein the finding step includes the step of finding other monitors by the display icons of those applications that are not on the Internet list.

19. A program storage device according to claim 16, wherein the organizing and prioritizing step includes the step of prioritizing the icons in accordance to the importance of the item.

* * * * *